United States Patent
Guo

(10) Patent No.: US 9,413,266 B2
(45) Date of Patent: Aug. 9, 2016

(54) POWER SUPPLY WITH DC BREAKER SWITCH AND REDUCED REGULATED DC LINK VOLTAGE

(71) Applicant: Fairchild Semiconductor Corporation, San Jose, CA (US)

(72) Inventor: Yigang (Jason) Guo, Cupertino, CA (US)

(73) Assignee: Fairchild Semiconductor Corporation, Sunnyvale, CA (US)

( * ) Notice: Subject to any disclaimer, the term of this patent is extended or adjusted under 35 U.S.C. 154(b) by 250 days.

(21) Appl. No.: 14/149,938

(22) Filed: Jan. 8, 2014

(65) Prior Publication Data

US 2014/0198543 A1    Jul. 17, 2014

Related U.S. Application Data

(60) Provisional application No. 61/751,438, filed on Jan. 11, 2013.

(51) Int. Cl.
*H02M 7/217* (2006.01)

(52) U.S. Cl.
CPC .................................. *H02M 7/2176* (2013.01)

(58) Field of Classification Search
CPC .................................................. H02M 7/2176
USPC ..................... 323/266, 282, 284, 285; 363/89
See application file for complete search history.

(56) References Cited

U.S. PATENT DOCUMENTS

| | | | | |
|---|---|---|---|---|
| 4,293,904 A | * | 10/1981 | Brooks | H02M 7/48 323/266 |
| 2012/0201055 A1 | | 8/2012 | Moon et al. | |
| 2012/0262139 A1 | * | 10/2012 | Moussaoui | H02M 1/44 323/282 |
| 2014/0198543 A1 | * | 7/2014 | Guo | H02M 7/2176 363/53 |
| 2014/0232366 A1 | * | 8/2014 | Lawson | H02J 3/32 323/282 |

* cited by examiner

*Primary Examiner* — Jeffrey Sterrett
(74) *Attorney, Agent, or Firm* — Grossman Tucker Perreault & Pfleger PLLC

(57) ABSTRACT

Generally, this disclosure provides circuits and methods to reduce and regulate DC link voltage in a power supply through the use of a DC breaker circuit. The breaker circuit may include a breaker switch configured to couple an input stage circuit of a power supply to an output stage circuit of the power supply and to provide a regulated DC link voltage to the output stage circuit, the level of the DC link voltage based on switching states of the breaker switch. The breaker circuit may further include a control circuit configured to generate a gate control signal to control the switching states of the breaker switch, the gate control signal based on a comparison of the DC link voltage to a high voltage threshold and a low voltage threshold, such that the magnitude of the DC link voltage is regulated to a set point and a peak-to-peak ripple.

14 Claims, 10 Drawing Sheets

POWER SUPPLY WITH DC BREAKER SWITCH AND REDUCED REGULATED DC LINK VOLTAGE

CROSS-REFERENCE TO RELATED APPLICATIONS

The present patent application is related to and claims priority to U.S. Provisional Patent Application Ser. No. 61/751,438, filed Jan. 11, 2013, the contents of which are incorporated herein by reference in their entirety.

FIELD

The present disclosure relates to power supplies, and more particularly, to power supplies with DC breaker switch circuitry providing reduced and regulated DC link voltage.

BACKGROUND

Existing power supplies often employ a rectifier circuit, for example a full bridge rectifier, at the input stage of the power supply to convert an alternating current (AC) sine wave input to a rectified sine wave. The rectified sine wave may be used to charge a capacitor to generate a direct current (DC) link voltage to drive the output stages of the power supply, for example an inverter/converter circuit. The DC link voltage, however, is typically close to the AC peak voltage which may be relatively large in magnitude. This may result in increased switching losses, noise, and standby (no load) power consumption. The use of relatively more expensive high voltage components, as well as inrush/surge current control and circuit protection components such as fuses and thermistors, may also be required which can increase the overall cost of the power supply.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides circuits, systems and methods to reduce and regulate DC link voltage in a power supply through the use of a DC breaker switch circuit. The DC breaker switch circuit may be configured to reduce the DC link voltage between an input stage of the power supply and an output stage of the power supply, as will be described in greater detail below. In some embodiments the power supply may be a switched mode power supply configured, for example, to convert an AC input voltage at a first level to a DC output voltage at a second level. The input stage of the power supply may include a rectifier circuit and the output stage of the power supply may include an inverter/converter circuit. The reduced DC link voltage, which may be regulated with increased precision, may allow for the use of lower voltage rated components having increased efficiency, smaller size and lower cost. The reduced DC link voltage may also result in lower power consumption during standby operation. The DC breaker switch circuit may also be configured to provide inrush/surge current control and protection for the power supply and the associated load by opening in response to excessive thermal, voltage or current conditions or opening under the control of a load switch or power management system.

Figure 1:
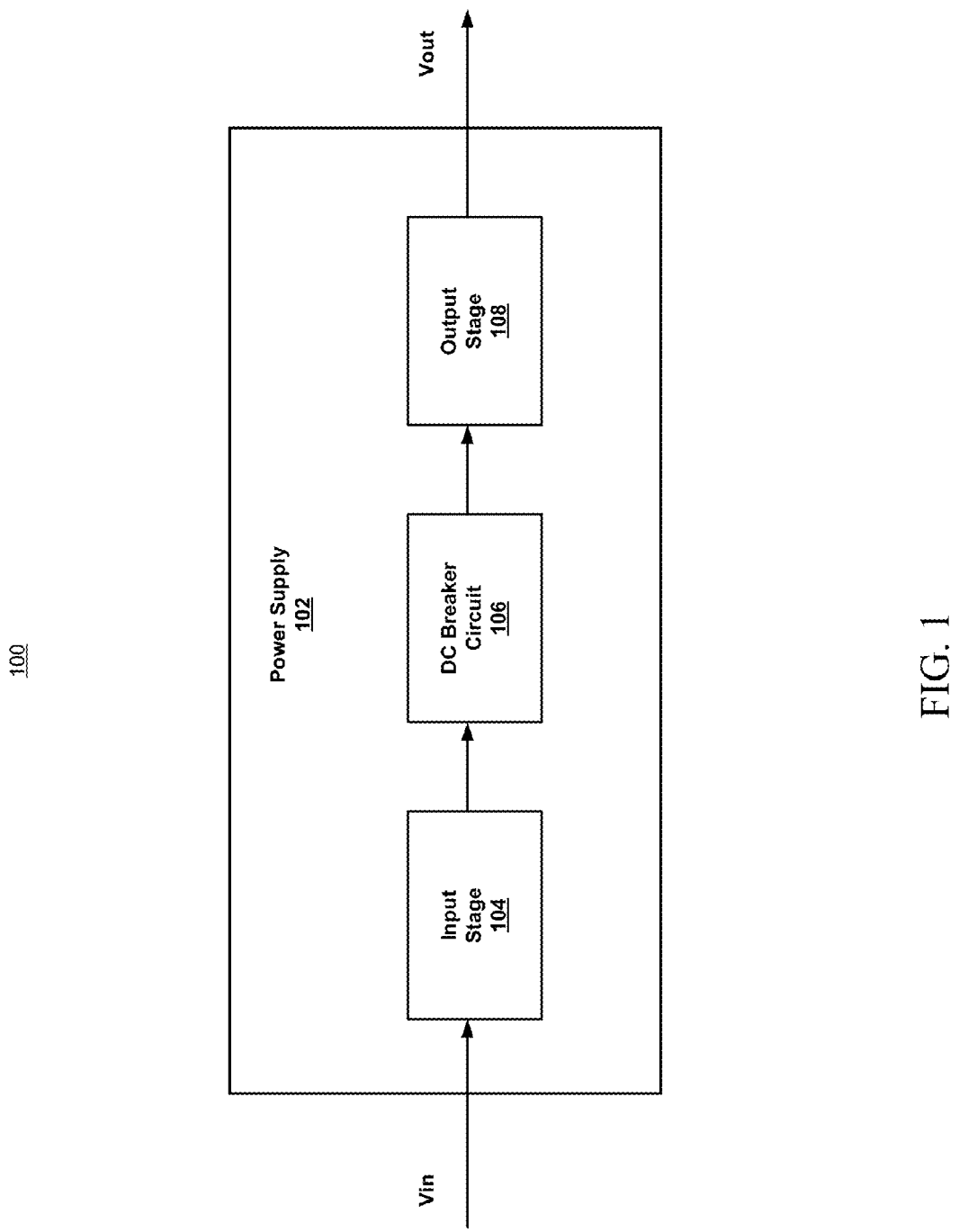
FIG. 1 illustrates a top level system diagram of one exemplary embodiment consistent with the present disclosure.

FIG. 1 illustrates a top level system diagram 100 of one exemplary embodiment consistent with the present disclosure. A power supply 102 is shown to include an input stage 104, configured to accept an input voltage Vin, and an output stage 108, configured to generate an output voltage Vout. The output voltage Vout may be a converted or voltage level transformed version of the input voltage Vin. A DC breaker circuit 106 couples the input stage 104 to the output stage 108 and may be configured to reduce and regulate the DC link voltage between the input and output stages of the power supply 102 as will be explained in greater detail below.

Figure 2:
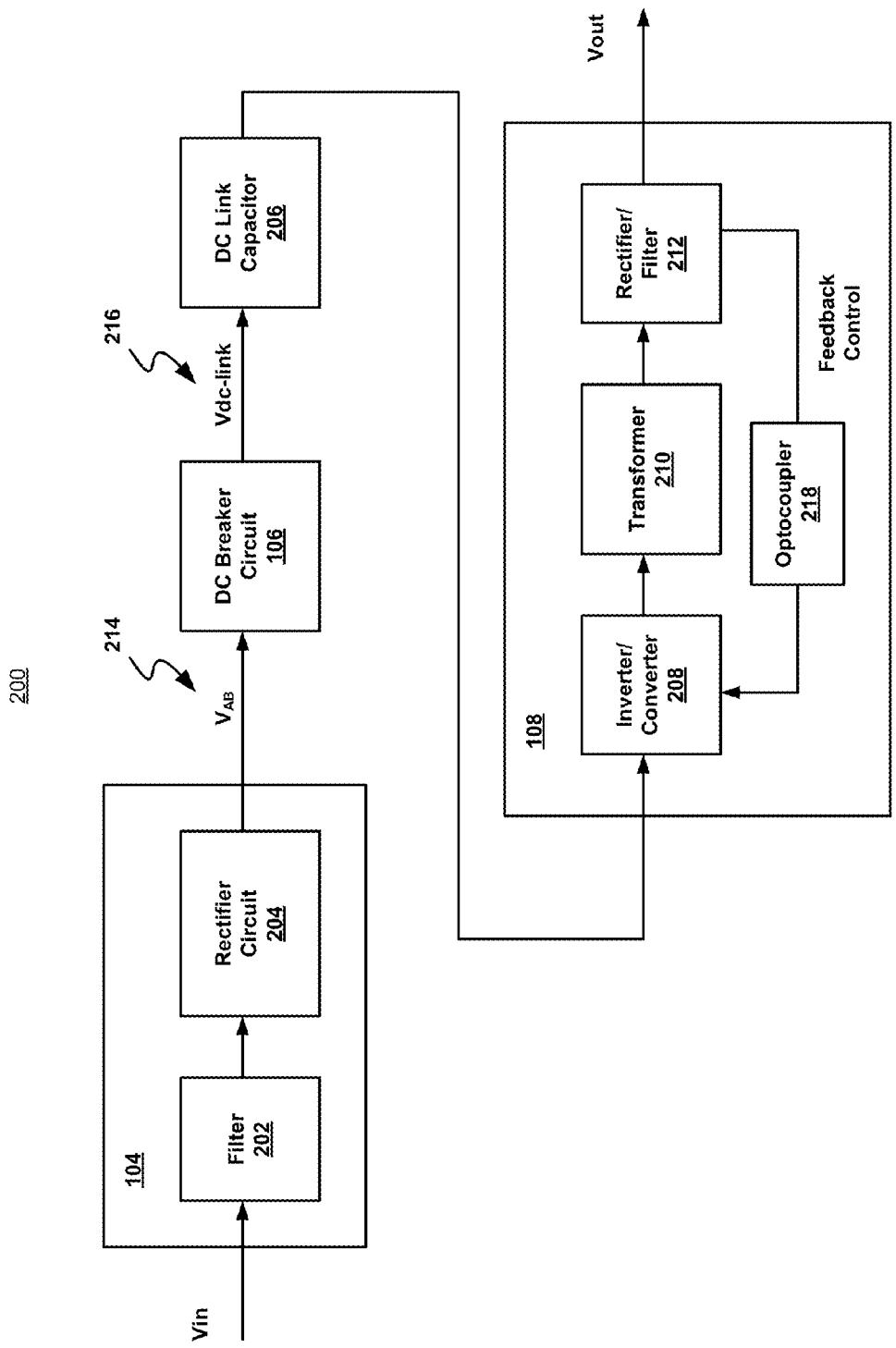
FIG. 2 illustrates a block diagram of one exemplary embodiment consistent with the present disclosure.
Figure 4:
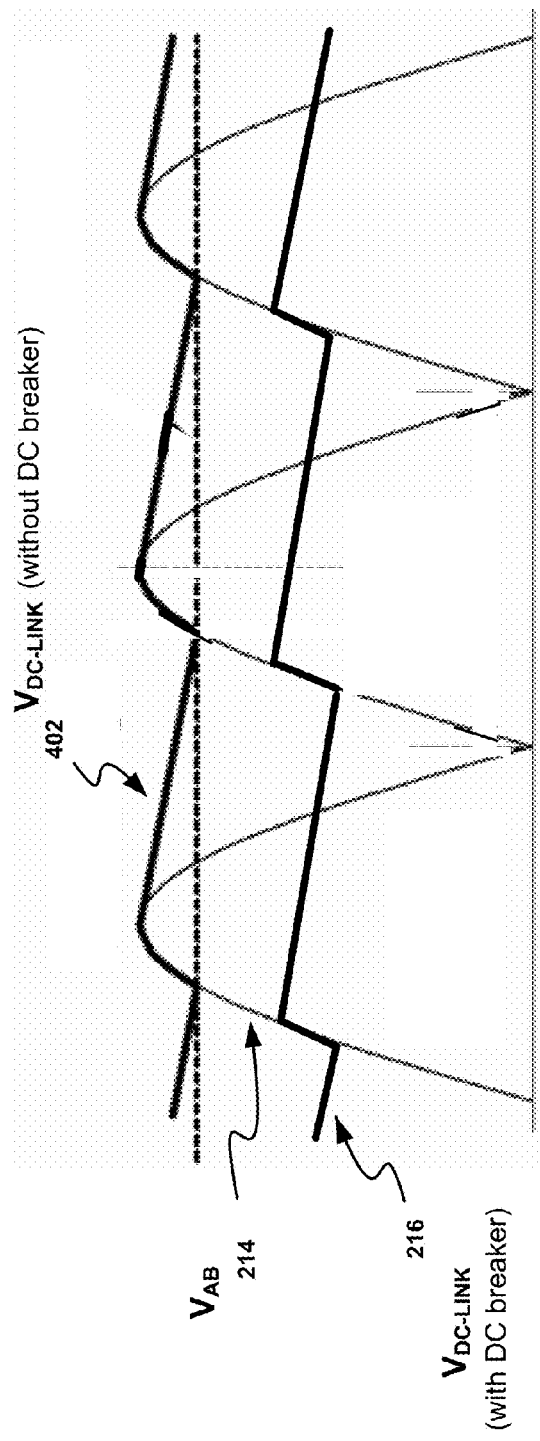
FIG. 4 illustrates voltage waveforms associated with one exemplary embodiment consistent with the present disclosure.

FIG. 2 illustrates a block diagram of one exemplary embodiment consistent with the present disclosure. Power supply 102 is shown in greater detail as an example configuration of a switched mode power supply. Input stage 104 is shown to include a filter circuit 202, which may be an electromagnetic interference (EMI) filter, and a rectifier circuit 204 which may be configured to rectify an AC input voltage Vin to provide a rectified voltage $V_{AB}$ 214. Rectifier circuit may be a full bridge rectifier, a synchronous rectifier, a bridgeless rectifier or any other suitable rectifier circuit, some examples of which will be illustrated below. DC breaker circuit 106 may be configured to generate a reduced and regulated rectified voltage, Vdc-link 216, supplied to DC link capacitor 206. This voltage reduction is illustrated in FIG. 4, which shows the rectified sine wave $V_{AB}$ 214 and a comparison of a reduced voltage Vdc-link 216 (using the DC breaker) to a more conventional Vdc-link 402 (without the use of a DC breaker circuit). In some applications, $V_{AB}$ 214, may range up to several hundred volts or more, thus the reduction in Vdc-link through the use of the DC breaker may be substantial (e.g., on the order of hundreds of volts or more).

The reduced DC link voltage 216 may then be provided the output stage 108 which may include an inverter/converter circuit 208 (which may comprise switches and pulse width modulation (PWM) control circuits), transformer 210, optocoupler 218 and output rectifier and filter 212 to produce the desired output voltage Vout. In some embodiments, feedback control may be provided from the output Vout back to the inverter/converter circuit 208 through an optocoupler (e.g., optical isolator) 218 to adjust the inverter/converter modulation (e.g., frequency and/or pulse width) to achieve or maintain the desired output voltage level.

Figure 3:
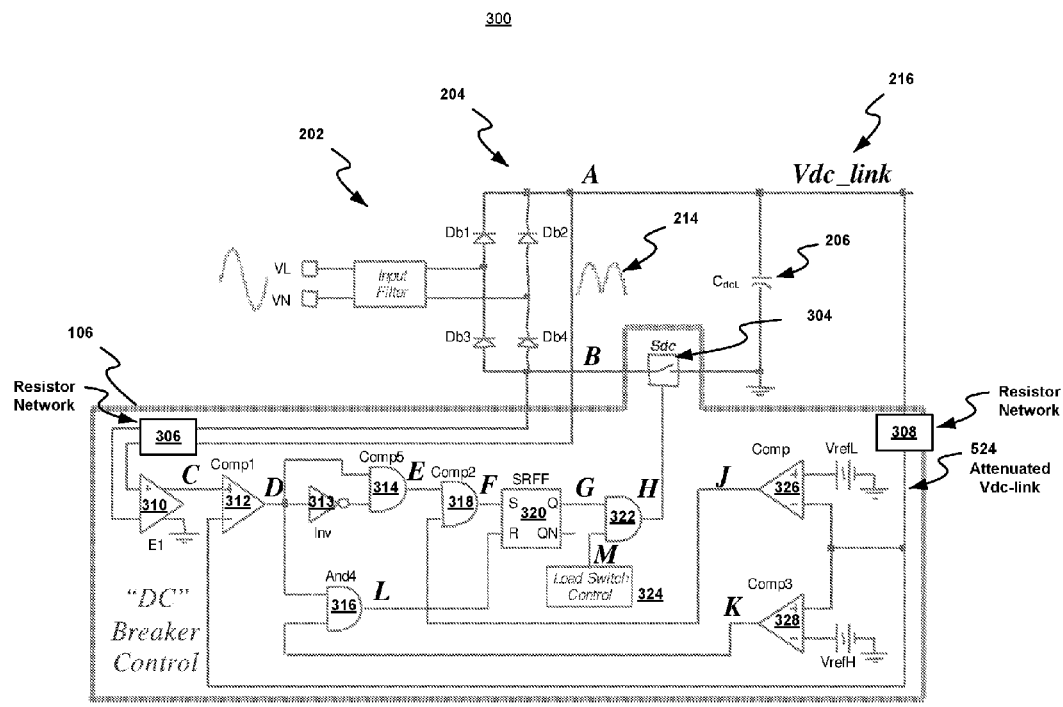
FIG. 3 illustrates a circuit diagram of one exemplary embodiment consistent with the present disclosure.
Figure 5:
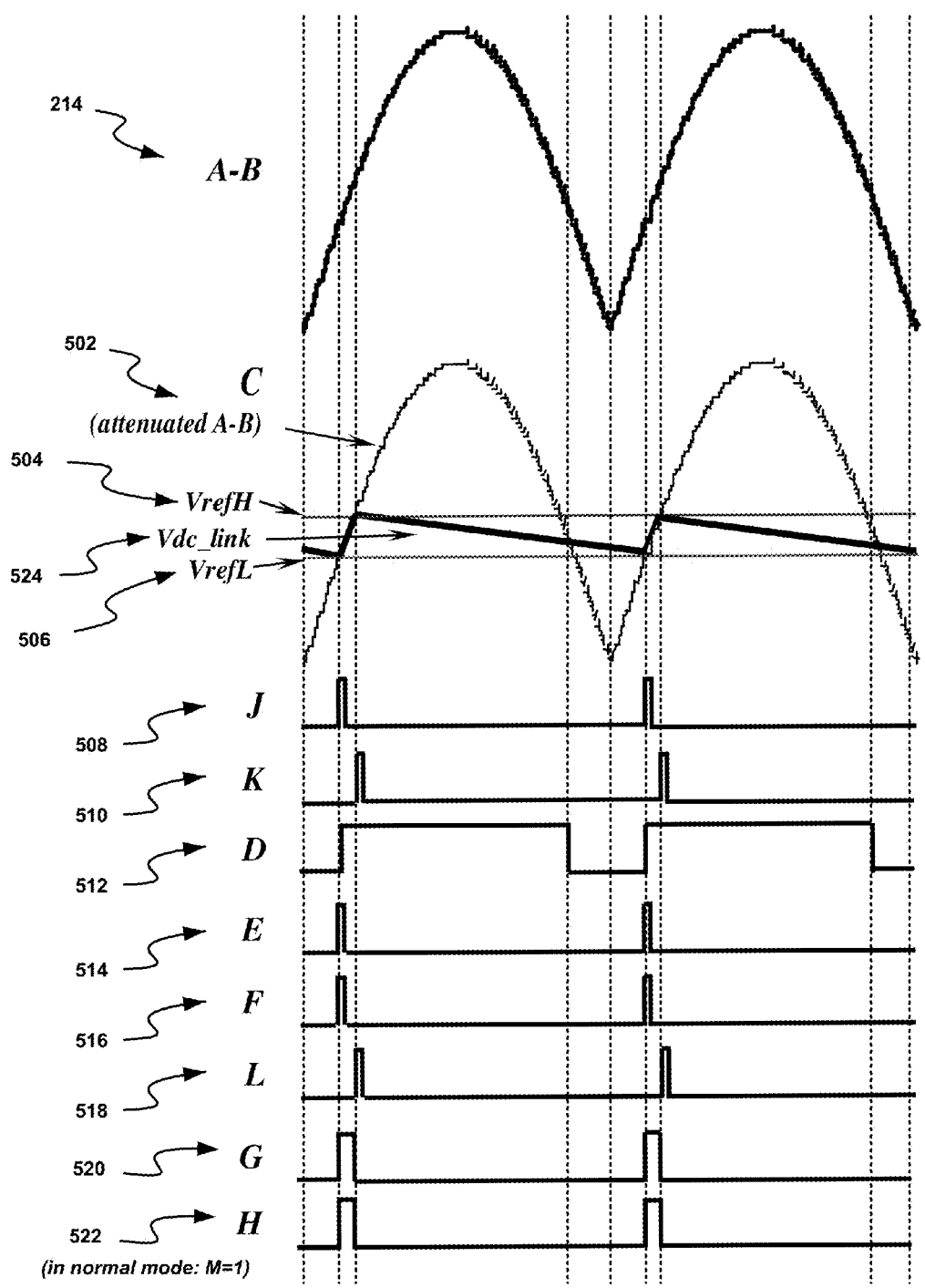
FIG. 5 illustrates voltage waveforms associated with one exemplary embodiment consistent with the present disclosure.

FIG. 3 illustrates a circuit diagram of one exemplary embodiment consistent with the present disclosure. DC breaker and associated control circuit 106 is shown in greater detail and the operation of the circuit is explained with reference to the voltage waveforms illustrated in FIG. 5. Switch Sdc 304, coupled between rectifier 204 and DC link capacitor $C_{dcL}$ 206, is selectively opened and closed during each cycle of $V_{AB}$ 214 to regulate the voltage range of Vdc-link 216, and for other purposes, as explained below. In some embodiments, under light load or no load conditions of the power supply, switch Sdc 304 may skip an on/off cycle (pulse) to further reduce power dissipation. In some embodiments, switch Sdc 304 may comprise a metal oxide semiconductor field effect transistor (MOSFET) or insulated-gate bipolar transistor (IGBT) switch.

Rectified voltage $V_{AB}$ 214, between nodes A and B, which may be relatively high voltage (e.g., hundreds of volts), is attenuated through a voltage divider resistor network 306 (or other suitable attenuation circuit) down to a voltage level that is compatible with control logic circuit processing (e.g., in the range of 5 volts or less) for use by the DC breaker and associated control circuit 106. The attenuated voltages are provided to a differencing circuit 310 to produce an attenuated rectified voltage C 502 that is referenced to ground. Vdc-link 216, which may also be at a relatively high voltage, is similarly attenuated through a voltage divider resistor network 308 (or other suitable attenuation circuit) down to attenuated Vdc-link 524 and provided to comparators 326 and 328.

Comparator 326 compares the attenuated Vdc-link 524 to a low voltage reference signal VrefL 506 and comparator 328 compares the attenuated Vdc-link 524 to a high voltage reference signal vRefH 504. The voltage reference signals 504, 506 may be chosen to define the upper and lower hysteresis control thresholds of the generated Vdc-link signal 216 to a desirable set-point and tolerance range (e.g., reduced in both magnitude and peak-to-peak voltage in comparison to $V_{AB}$ 214). The output of comparators 326, 328 are gating control signals J 508 and K 510 that mark a region of interest on the rising edge of $V_{AB}$ 214 that will correspond to the voltage ripple of generated Vdc-link signal 216.

Attenuated rectified voltage C 502 is compared to attenuated Vdc-link 524 by comparator 312 to generate gating signal D 512 which corresponds to the region where $V_{AB}$ 214 is greater than Vdc-link 216. A one shot signal E 514 is generated through inverter 313 and comparator 314 upon signal D 512 changing level from low to high. This one shot signal E 514 is generated to facilitate signal processing. This signal E 514 together with J 508 (once both signals turn high) generates a turn-on signal F 516 for the flip-flop SREF 320 that provides a synchronous function of increased precision to the DC breaker circuit 106 by defining a time to turn on the switch Sdc 304, and thus achieve zero voltage switching (ZVS) at turn on of Sdc 304. Control signal K 510 is gated with signal D 512 to generate a turn off signal for Sdc 304 through flip-flop SREF 320. Signals F 516 and L 518 serve as set and reset control signals respectively for the flip-flop SREF 320 to generate gate drive signal G 520.

Gate drive signal G 520 is gated with load switch control signal M by AND gate 322. During normal operation, load switch control signal M is high and control signal G 520 is passed through to generate control signal H 522 for controlling Sdc switch 304. Sdc switch 304 is closed when control signal H 522 is high, permitting DC link capacitor 206 to charge. Sdc switch 304 is opened when control signal H 522 returns to a low state. The toggling of Sdc switch 304 in this manner regulates and restricts Vdc-link signal 216 to a range defined by the threshold voltage reference signals 504, 506. In some embodiments, a gate drive circuit (not shown) may be used to convert signal H 522 to a suitable gate driving signal for Sdc 304.

Gating signal E 514 provides synchronization of the switching times of Sdc switch 304 to the frequency of $V_{AB}$ 214 enabling zero voltage switching (ZVS) to be achieved on the Sdc switch 304. Zero voltage switching, where, for example, the drain to source voltage of a MOSFTET switch is substantially zero volts when the switch is opened and closed, may avoid switching losses and reduce electrical stress to DC link capacitor $C_{dcL}$ 206 (e.g, if Sdc 304 turns on when V is higher than the voltage across $C_{dcL}$ 206).

Load switch control signal M may be provided to override control signal G 520 and drive Sdc switch 304 open (e.g., to operate as a DC circuit breaker). This may be employed to provide protection to the power supply and/or load in the event of an externally sensed over-current condition, over-voltage condition, over-temperature condition and/or other transient condition and may eliminate the need for fuses, thermistors, varistors, etc. In some embodiments, the load switch control signal M may also be used to control in-rush current. In some embodiments, load switch control signal M may comply with advanced power management communication protocols and may be supplied by a computer system or power supply controller.

Sdc switch 304 is shown, in FIG. 3, as coupled between the low side (B) of rectifier 204 and ground. In some embodiments, however, the switch may be coupled to between the high side (A) of rectifier 204 and the high side of DC link capacitor 206.

Figure 6:
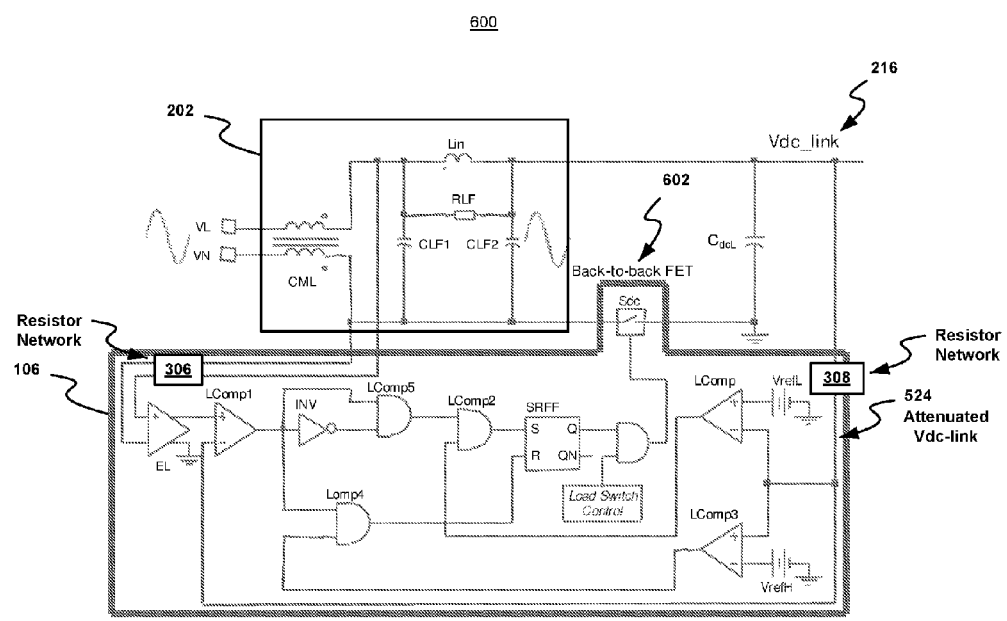
FIG. 6 illustrates a circuit diagram of another exemplary embodiment consistent with the present disclosure.

FIG. 6 illustrates a circuit diagram of another exemplary embodiment consistent with the present disclosure. In this embodiment, which may be suitable for lower power applications, the switch Sdc 304 may comprise back to back MOSFETs 602 in a synchronous rectifier configuration to filter out the negative voltage phases of the input sine wave and thus replace the operation of the diode bridge rectifier. By eliminating the diode bridge rectifier, the 0.7 volt drop associated with the typical forward bias of each diode may be avoided for a total savings of 1.4 volts. The remaining portion of the DC breaker circuit 106 operates as described previously.

Figure 7:
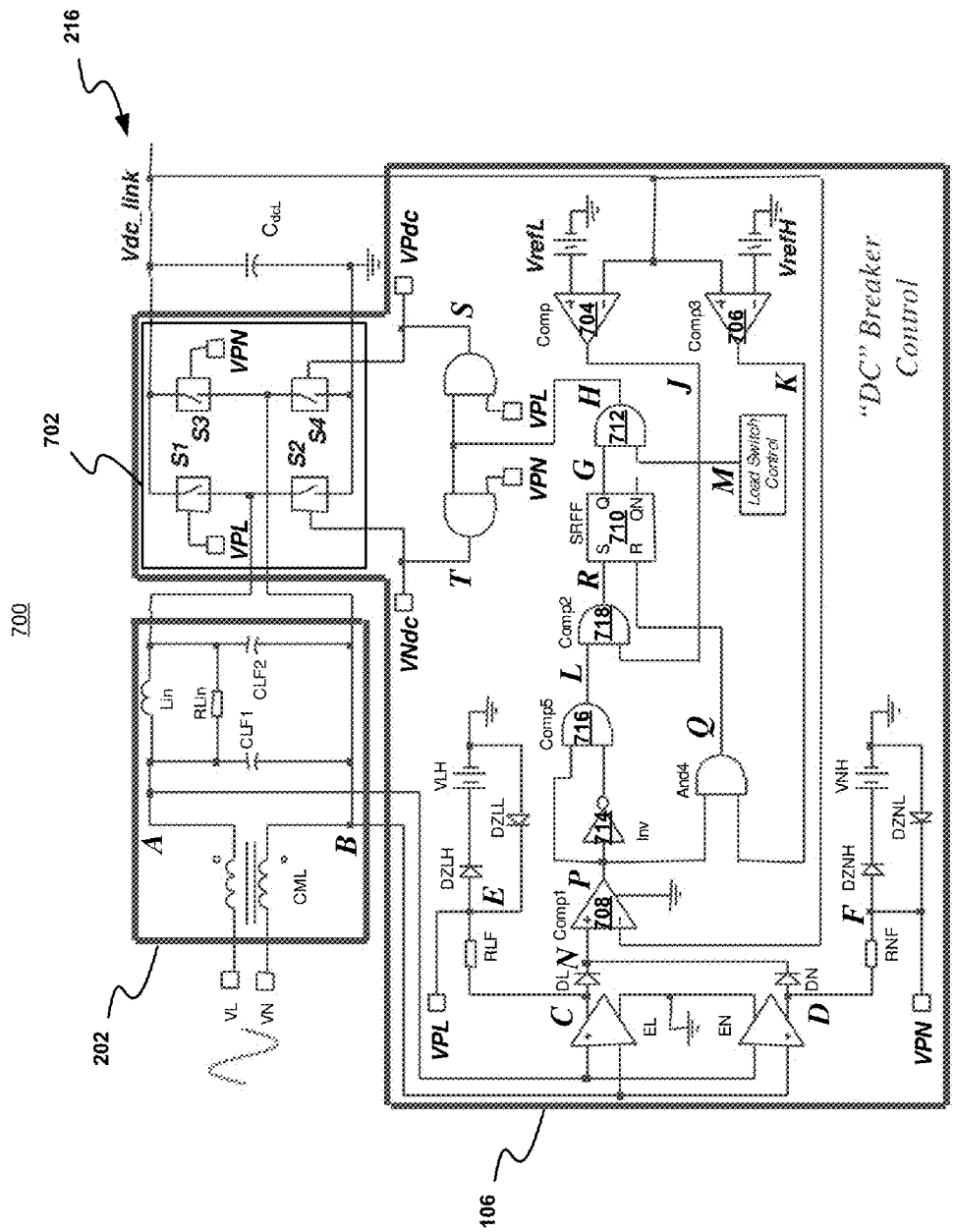
FIG. 7 illustrates a circuit diagram of another exemplary embodiment consistent with the present disclosure.
Figure 8:
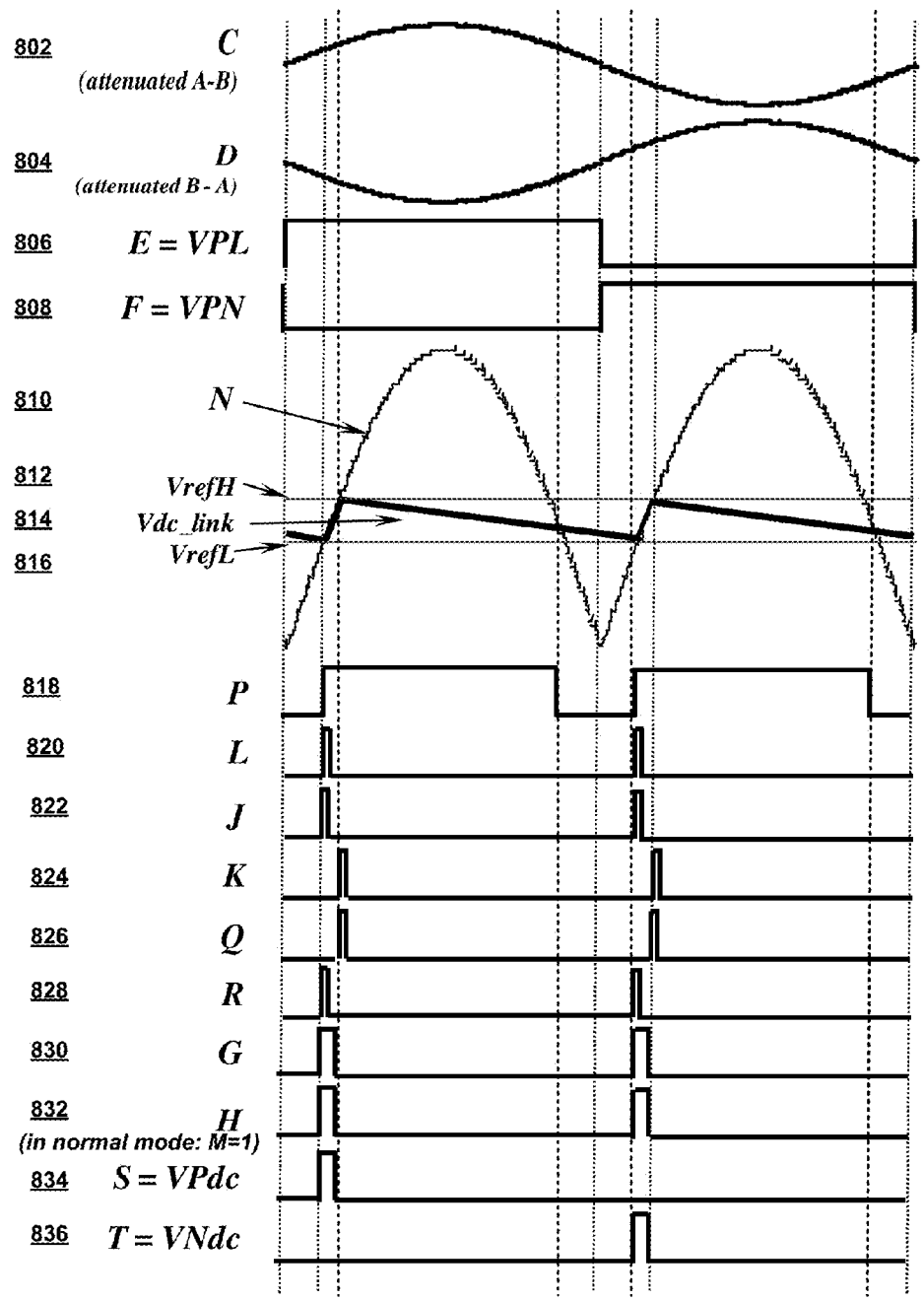
FIG. 8 illustrates voltage waveforms associated with another exemplary embodiment consistent with the present disclosure.

FIG. 7 illustrates a circuit diagram of another exemplary embodiment consistent with the present disclosure. In this embodiment, the switch Sdc 304 may comprise a pair of back to back MOSFETs 702 (S2-S4 and S1-S3) in a synchronous rectifier configuration, which is also illustrated in greater detail in FIG. 9. The operation of DC breaker circuit 106 is explained with reference to the voltage waveforms illustrated in FIG. 8. The relatively higher voltage signals, $V_{AB}$ and Vdc-link, are attenuated as previously described, through a voltage divider resistor network (not shown in this drawing) down to a voltage level that is compatible with control logic circuit processing.

Comparator 704 compares the attenuated Vdc-link 814 to a low voltage reference signal 816 and comparator 706 compares the attenuated Vdc-link 814 to a high voltage reference signal 812. The voltage reference signals 812, 816 may be chosen to define the upper and lower thresholds of the generated Vdc-link signal 216 to a desirable set-point and range (e.g., reduced in comparison to $V_{AB}$). The output of comparators 704, 706 are gating control signals J 822 and K 824 that mark a region of interest on the rising edge of $V_{AB}$ that will correspond to the voltage set-point and range of generated Vdc-link signal 216.

The attenuated voltage differences C=A−B 802 and D=B−A 804 are generated and combined through diodes DL and DN to form a rectified voltage waveform N 810. The C signal 802 is also used to generate a gating signal E=VPL 806 that corresponds to the region where C 802 is positive (and D 804 is negative). The D signal 804 is also used to generate a gating signal F=VPN 808 that corresponds to the region where C 802 is negative (and D 804 is positive).

Rectified voltage waveform N 810 is compared to attenuated Vdc-link by comparator 708 to generate gating signal P 818 which corresponds to the region where $V_{AB}$ 214 is greater than Vdc-link 216. A one shot pulse L 820 is generated based on the rising edge of signal P 818 (from low to high) through inverter 714 and comparator 716 to facilitate signal processing. This gating signal L 820 together with J 822 through an AND gate 718 provides a synchronized turn on signal R 828 for the DC breaker circuit 106 by defining a time at which the lower switches of Sdc 702 (S2 or S4) may be turned on, thus achieving zero voltage switching (ZVS) at turn-on and reducing electrical stress to CdcL. Control signal K 824 is gated with signal P 818 to generate turn off control signal Q 826 for S2 or S4 of Sdc switch 702. A flip-flop 710 is used to generate control signal G 830 for S2 and S4 of Sdc switch 702 by R 828 (set) and Q 826 (reset) respectively.

Control signal G 830 is gated with load switch control signal M by AND gate 712. During normal operation, load switch control signal M is high and control signal G 830 is passed through to generate control signal H 832. Control signal H 832 is split and gated with signals VPL 806 and VPN 808 to generate alternating control signals VPdc 834 and VNdc 836 corresponding to the alternate positive and negative phases of $V_{AB}$ respectively. VPdc 834 and VNdc 836 alternately close switches S2 and S4 of Sdc switch 702 to control the charging of DC link capacitor 206 such that Vdc-link signal 216 is regulated to a range defined be the threshold voltage reference signals 812, 816.

Load switch control signal M operates in a manner similar to that which was previously described in connection with the circuit of FIG. 3.

Figure 9:
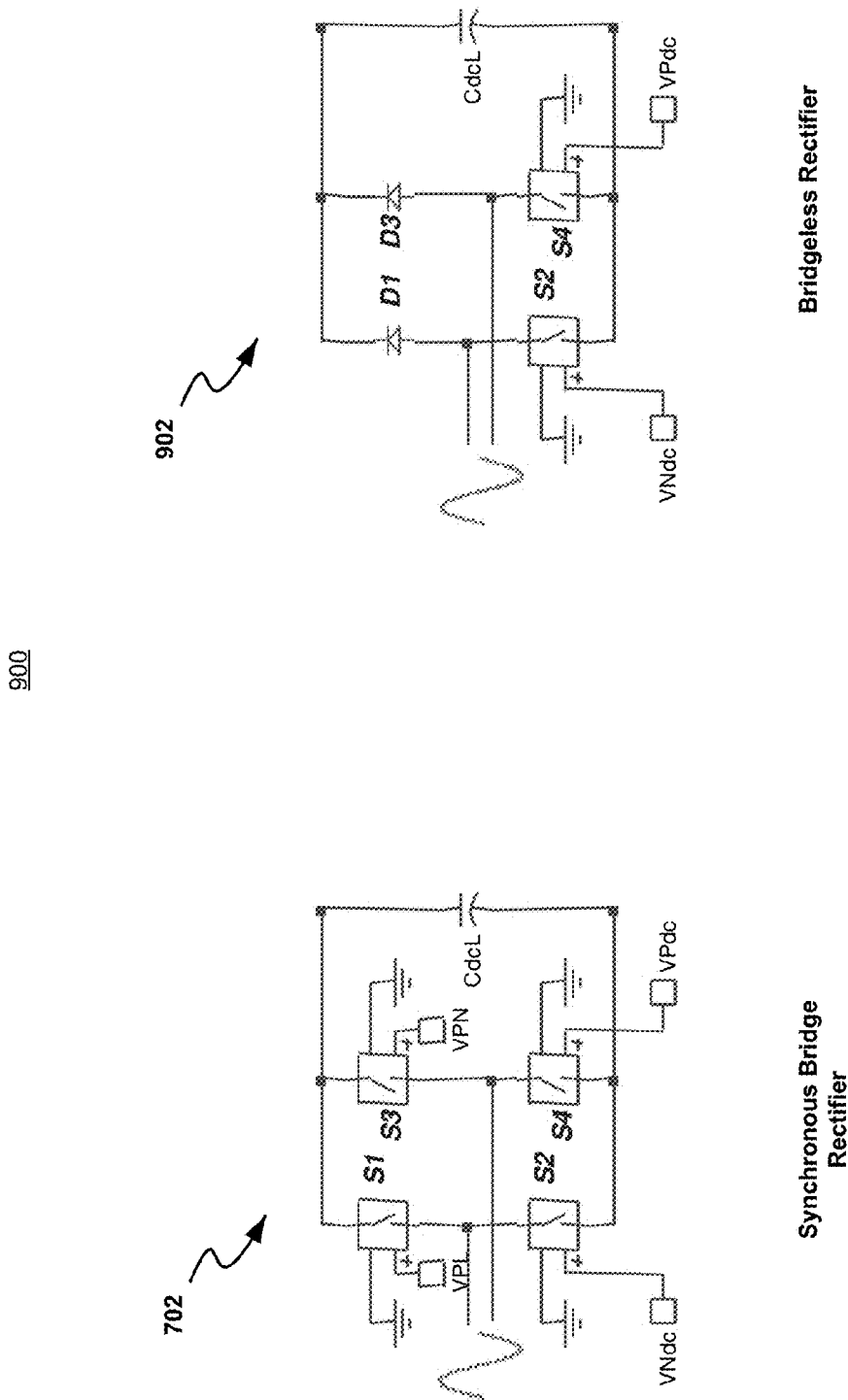
FIG. 9 illustrates a circuit diagram of another exemplary embodiment consistent with the present disclosure.

FIG. 9 illustrates a circuit diagram of another exemplary embodiment consistent with the present disclosure. A bridgeless rectifier configuration 902 is shown as an alternative to the synchronous bridge rectifier 702. In this embodiment, diodes D1 and D3 replace switches S1 and S3 and may provide a reduced cost circuit implementation at the expense of an additional forward bias voltage drop associated with the diodes.

Figure 10:
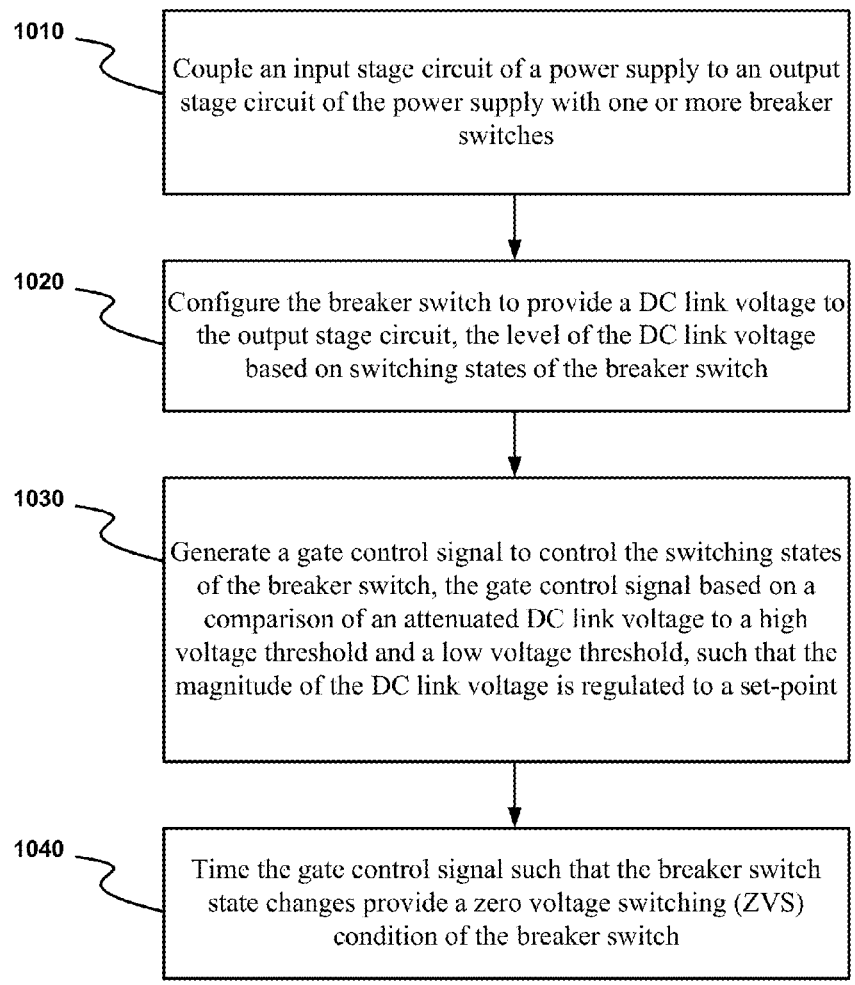
FIG. 10 illustrates a flowchart of operations of an exemplary embodiment consistent with the present disclosure.

FIG. 10 illustrates a flowchart of operations 1000 of an exemplary embodiment consistent with the present disclosure. At operation 1010, an input stage circuit of a power supply is coupled to an output stage circuit of the power supply with one or more breaker switches. At operation 1020, the breaker switch is configured to provide a DC link voltage to the output stage circuit, the level of the DC link voltage based on switching states of the breaker switch. At operation 1030, a gate control signal is generated to control the switching states of the breaker switch, the gate control signal based on a comparison of an attenuated DC link voltage to a high voltage threshold and a low voltage threshold, such that the magnitude of the DC link voltage is regulated to a set-point. At operation 1040, the gate control signal is timed such that the breaker switch state changes provide a zero voltage switching (ZVS) condition of the breaker switch.

Thus, the present disclosure provides devices, methods and systems for power supplies with DC breaker switch circuitry providing reduced and regulated DC link voltage. The following examples pertain to further embodiments.

According to one aspect there is provided a direct current (DC) breaker circuit. The DC breaker circuit may include a breaker switch configured to couple an input stage circuit of a power supply to an output stage circuit of the power supply and to provide a regulated DC link voltage to the output stage circuit, the level of the DC link voltage based on switching states of the breaker switch. The DC breaker circuit of this example may also include a control circuit configured to generate a gate control signal to control the switching states of the breaker switch, the gate control signal based on a comparison of the DC link voltage to a high voltage threshold and a low voltage threshold, such that the magnitude of the DC link voltage is regulated to a set point and a peak-to-peak ripple. The control circuit of this example may further be configured to generate the gate control signal such that the breaker switch state changes are synchronized with a frequency of a voltage provided by the input stage circuit to provide a zero voltage switching (ZVS) condition of the breaker switch.

According to another aspect there is provided a method. The method may include coupling an input stage circuit of a power supply to an output stage circuit of the power supply with a breaker switch. The method of this example may also include configuring the breaker switch to provide a DC link voltage to the output stage circuit, the level of the DC link voltage based on switching states of the breaker switch. The method of this example may further include generating a gate control signal to control the switching states of the breaker switch, the gate control signal based on a comparison of the DC link voltage to a high voltage threshold and a low voltage threshold, such that the magnitude of the DC link voltage is regulated to a set point and a peak-to-peak ripple. The method of this example may further include timing the gate control signal such that the breaker switch state changes provide a zero voltage switching (ZVS) condition of the breaker switch.

According to another aspect there is provided a power supply system. The power supply system may include an input stage circuit configured to accept an input voltage and an output stage circuit configured to provide an output voltage. The power supply system of this example may also include a breaker switch configured to couple the input stage circuit to the output stage circuit and to provide a regulated DC link voltage to the output stage circuit, the level of the DC link voltage based on switching states of the breaker switch. The power supply system of this example may further include a control circuit configured to generate a gate control signal to control the switching states of the breaker switch, the gate control signal based on a comparison of the DC link voltage to a high voltage threshold and a low voltage threshold, such that the magnitude of the DC link voltage is regulated to a set point and a peak-to-peak ripple.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may comprise, for example, singly or in any combination, hardwired circuitry, programmable circuitry, state machine circuitry, and/or firmware that stores instructions executed by programmable circuitry. An app may be embodied as code or instructions which may be executed on programmable circuitry such as a host processor or other programmable circuitry. A module, as used in any embodiment herein, may be embodied as circuitry. The circuitry may be embodied as an integrated circuit, such as an integrated circuit chip.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A direct current (DC) breaker circuit comprising:
   a breaker switch configured to couple an input stage circuit of a power supply to an output stage circuit of said power supply and to provide a regulated DC link voltage to said output stage circuit, the level of said DC link voltage based on switching states of said breaker switch;
   a control circuit configured to generate a gate control signal to control said switching states of said breaker switch, said gate control signal based on a comparison of said DC link voltage to a high voltage threshold and a low voltage threshold, such that the magnitude of said DC link voltage is regulated to a set point and a peak-to-peak ripple; and
   said control circuit further configured to generate said gate control signal such that said breaker switch state changes are synchronized with a frequency of a voltage provided by said input stage circuit to provide a zero voltage switching (ZVS) condition of said breaker switch.

2. The DC breaker circuit of claim 1, further comprising a hysteresis control circuit configured to limit switching state changes of said breaker circuit in response to noise associated with said voltage provided by said input stage circuit.

3. The DC breaker circuit of claim 1, wherein said breaker switch is a synchronous bridge rectifier.

4. The DC breaker circuit of claim 1, wherein said breaker switch is a bridgeless rectifier.

5. A method for reducing and regulating a DC link voltage in a power supply, said method comprising:
   coupling an input stage circuit of a power supply to an output stage circuit of said power supply with a breaker switch;
   configuring said breaker switch to provide a DC link voltage to said output stage circuit, the level of said DC link voltage based on switching states of said breaker switch;
   generating a gate control signal to control said switching states of said breaker switch, said gate control signal based on a comparison of said DC link voltage to a high voltage threshold and a low voltage threshold, such that the magnitude of said DC link voltage is regulated to a set point and a peak-to-peak ripple; and
   timing said gate control signal such that said breaker switch state changes provide a zero voltage switching (ZVS) condition of said breaker switch.

6. The method of claim 5, wherein said breaker switch is a bridgeless rectifier.

7. The method of claim 5, wherein said breaker switch is a synchronous bridge rectifier.

8. The method of claim 5, further comprising limiting switching state changes of said breaker switch in response to noise associated with said voltage provided by said input stage circuit.

9. A power supply system comprising:
   an input stage circuit configured to accept an input voltage;
   an output stage circuit configured to provide an output voltage;
   a breaker switch configured to couple said input stage circuit to said output stage circuit and to provide a regulated DC link voltage to said output stage circuit, the level of said DC link voltage based on switching states of said breaker switch; and
   a control circuit configured to generate a gate control signal to control said switching states of said breaker switch, said gate control signal based on a comparison of said DC link voltage to a high voltage threshold and a low voltage threshold, such that the magnitude of said DC link voltage is regulated to a set point and a peak-to-peak ripple.

10. The power supply system of claim 9, wherein said power supply is a switched mode power supply and said input stage circuit comprises an electromagnetic interference (EMI) filter.

11. The power supply system of claim 9, wherein said breaker switch is a bridgeless rectifier.

12. The power supply system of claim 9, wherein said breaker switch is a synchronous bridge rectifier.

13. The power supply system of claim 9, further comprising a hysteresis control circuit configured to limit switching state changes of said breaker switch in response to noise associated with said voltage provided by said input stage circuit.

14. The power supply system of claim 9, wherein said control circuit is further configured to generate said gate control signal such that said breaker switch state changes are synchronized with a frequency of a voltage provided by said input stage circuit to provide a zero voltage switching (ZVS) condition of said breaker switch.

* * * * *